Nov. 10, 1970  J. F. BURKE ET AL  3,538,775

ROTATIONAL SPEED SENSING METHOD AND APPARATUS

Filed July 29, 1968  2 Sheets-Sheet 1

INVENTORS
JOHN F. BURKE &
ARTHUR J. OSTDIEK
BY HARRY M. SARAGOVITZ,
EDWARD J. KELLY, HERBERT BERL
& J. D. EDGERTON  ATTORNEYS

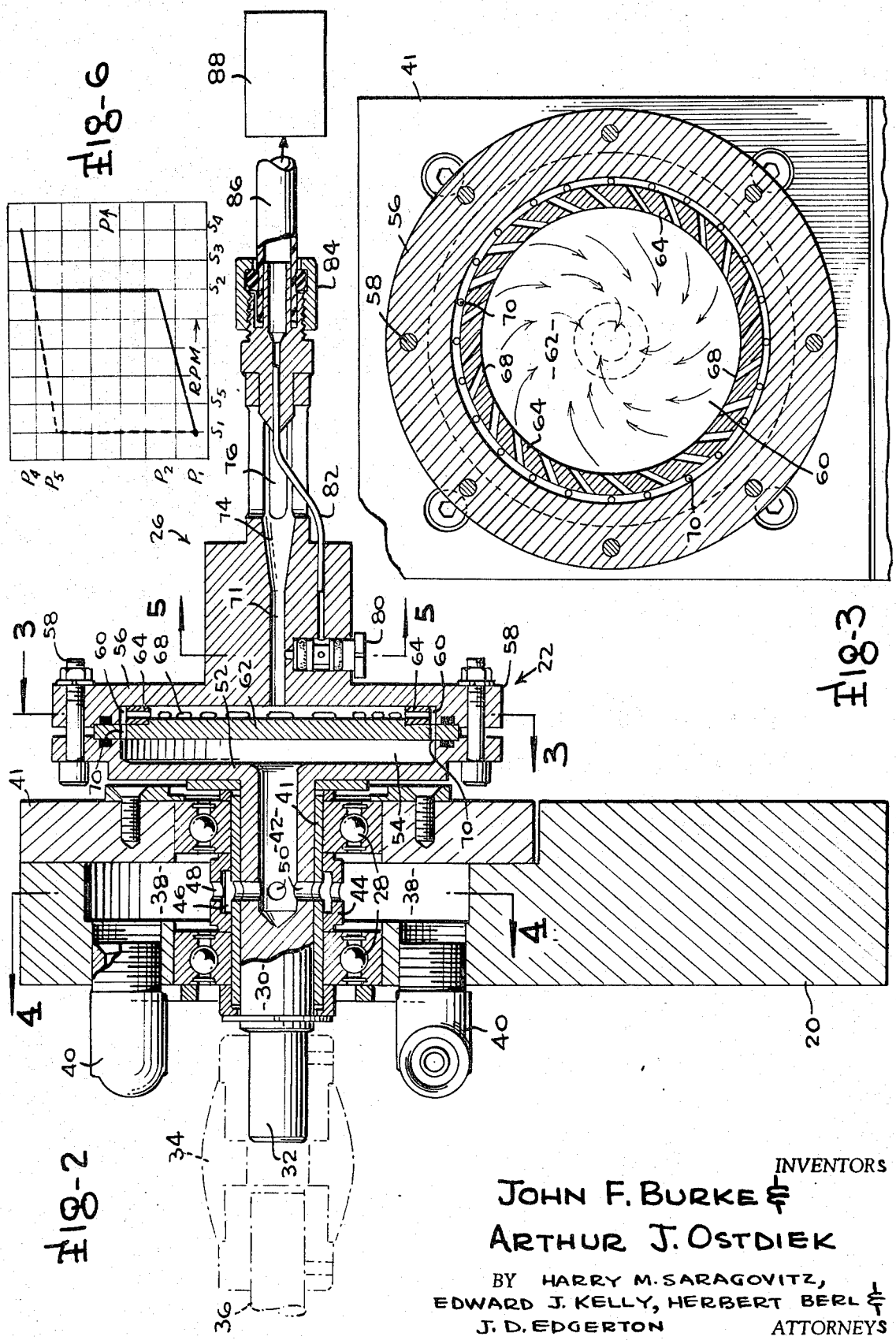

United States Patent Office 3,538,775
Patented Nov. 10, 1970

3,538,775
ROTATIONAL SPEED SENSING METHOD AND APPARATUS
John F. Burke, Beltsville, and Arthur J. Ostdiek, Silver Spring, Md., assignors to the United States of America as represented by the Secretary of the Army
Filed July 29, 1968, Ser. No. 748,466
Int. Cl. G01p *3/26*
U.S. Cl. 73—521          8 Claims

ABSTRACT OF THE DISCLOSURE

A vortex type rotational speed sensor apparatus and method employing a vortex chamber rotatably mounted and formed with a peripheral wall formed of a removable nozzle ring having a plurality of nozzles communicating with the interior of the chamber to provide fluid flow through the nozzles of a given fluid vorticity to exhaust through an axial exhaust conduit with the nozzle ring being removable to allow replacement with another nozzle ring having nozzles oriented at a different angle with respect to the chamber to provide a different vorticity of flow with pressure detector means in the exhaust conduit to detect significant pressure level changes through a critical pressure level caused by changes in rotational speed of the sensor through critical speeds of different values in accordance with the particular nozzle ring being employed.

BACKGROUND OF THE INVENTION

This invention relates to the field of speed sensing apparatus and is specifically directed to a device for sensing the speed of rotation of a monitored rotating body and providing an output signal in response to speed variation through a critical speed. The speed variations can be either an increasing or decreasing variation in accordance with the nature of the environmental employment of the subject invention. Moreover, this invention is specifically directed to a fluid vortex chamber sensor in which the pressure in exhaust conduit undergoes a large change as the speed of rotation of the vortex chamber passes through a critical speed creating a pressure discontinuity in the discharge conduit from the vortex chamber. Detection of this large pressure variation provides a signal indicative of the speed change through the critical speed.

The prior art is replete with rotational speed sensing devices for detecting the speed of rotation of driven machinery and, in many instances, providing control signals for maintaining a desired rotational speed or for providing warning signals to the operator indicative of an undesired speed variation. Unfortunately, the prior art devices have often been both costly and so excessively complicated as to unfortunately suffer consequent breakdowns and have a low reliability factor. The more simple devices, on the other hand, have not provided the required degree of accuracy needed by modern technology. Therefore, there has been a long felt need for a simple and reliable speed sensor capable of high accuracy while being simple to construct and maintain. This invention provides such a device.

One previously known rotational rate sensor illustrated in U.S. Pat. No. 3,023,237 employs a fixed nozzle ring having radially aligned nozzles for injecting fluid into a vortex chamber for discharge to an axial outlet. The discharge flow or input pressure of the fluid flowing through the outlet provides a constantly varying output signal in accordance with the rotational speed of the device. However, the device is limited as to versatility due to the fixed nozzle construction and is not capable of satisfactory use over a wide range of rotational speeds.

SUMMARY OF THE INVENTION

This invention is resultant from the discovery that a fluid vortex rotational rate sensor has a distinct pressure discontinuity between two distinct pressure levels in its discharge conduit as the sensor changes rotational speed through a critical speed and that this critical speed can be accurately controlled by varying the absolute vorticity within the chamber through the use of nozzles angled in varying degrees with respect to the chamber. The application of this principle is enabled through the apparatus of this invention which comprises a vortex chamber mounted for rotation on suitable bearing means over a wide range of rotational speeds. Pressure responsive means connected to the discharge conduit provides an output signal in response to a speed change through the critical rotational speed which causes an abrupt pressure change from one pressure level to another significantly different pressure level in the discharge line.

In other words, the method of this invention involves the discovery that fluid flow in a vortex chamber can be shifted abruptly from nearly radial flow to an intense swirl (high vorticity) by slightly increasing the tangential velocity at the outer radius of the vortex chamber through which the flow is provided by peripheral nozzle means. Increasing the angular rate of chamber rotation beyond such a critical value has the effect of providing an abrupt static pressure increase in the drain.

This invention provides means for employing different nozzle angles with respect to the vortex chamber so that the critical angular rate can be varied over a wide range of values. For example, the chamber can be provided with nozzles oriented at an angle with respect to the center of the chamber so as to provide a certain amount of absolute vorticity even when the sensor is stationary. Moreover, the nozzles can be provided to give either clockwise or counter clockwise swirl during a stationary operation of the device. Consequently, the critical rotational speed which depends upon the relative vorticity of fluid flow in the chamber can be varied to assume any desired level in accordance with the nature of the device with which the sensor is to be employed.

Specifically, the instant invention comprises a fluid vortex chamber having an outer wall provided by a nozzle ring. The nozzle ring has a plurality of nozzles all of which are oriented at the same given angle with respect to the chamber. The nozzle ring is clamped between two clamp plates and is easily removed so that another nozzle ring having a different nozzle orientation can be reinserted to provide a desired critical speed.

Therefore, it is the primary object of this invention to provide a new and improved method and apparatus for sensing rotational rates.

DESCRIPTION OF THE DRAWINGS

FIG. 2 is a sectional view taken along lines 2—2 of FIG. 1;
FIG. 3 is a sectional view taken along lines 3—3 of FIG. 2;
FIG. 6 is a chart illustrating the pressure variations in the discharge conduit during passage of the sensor through a critical speed.

DESCRIPTION OF THE PREFERRED EMBODIMENT

Figure 1:
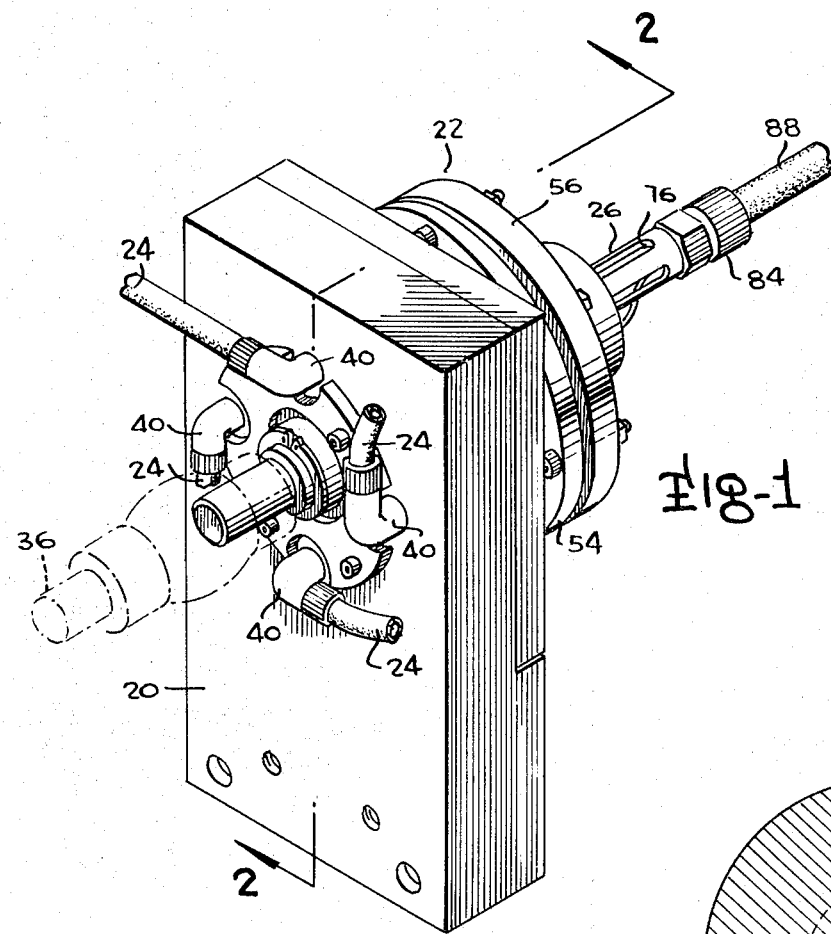
FIG. 1 is a perspective view of the preferred embodiment for practice of this invention.
Figure 5:
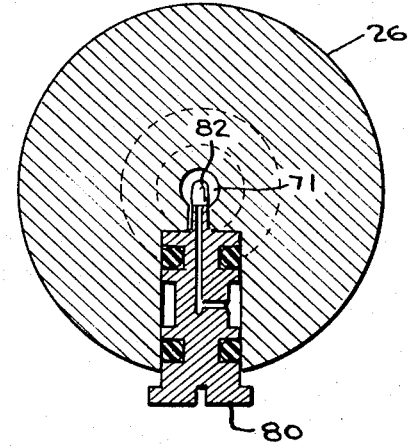
FIG. 5 is a sectional view taken along lines 5—5 of FIG. 2.

Attention is initially invited to FIG. 1 of the drawings which illustrates the preferred embodiment of practicing the subject invention. A support block 20 which can be attached to any convenient frame or other support by means of the holes bored through the lower portion thereof provides the support for the other elements. The basic elements of the preferred embodiment are a rotatably supported vortex chamber generally designated 22 which receives pressurized fluid from supply line 24 and which discharges fluid through an exhaust discharge conduit 26.

Ball bearings 28 are provided in a cylindrical opening in support block 20 for rotatably supporting a stub shaft 30 which has one end supportingly connected to the vortex chamber for enabling rotation of the chamber. The power input end of the shaft 30 is in the form of a reduced diameter forwardly extending portion 32 that is connected by any conventional coupling 34 illustrated by the dashed outlines of FIG. 2 to the output shaft 36 of the monitored device whose rotational speed is desired to be monitored. Such a device could, for example, be a gas or steam turbine, a pump, electric motor or practically any other form of rotary element.

Figure 4:
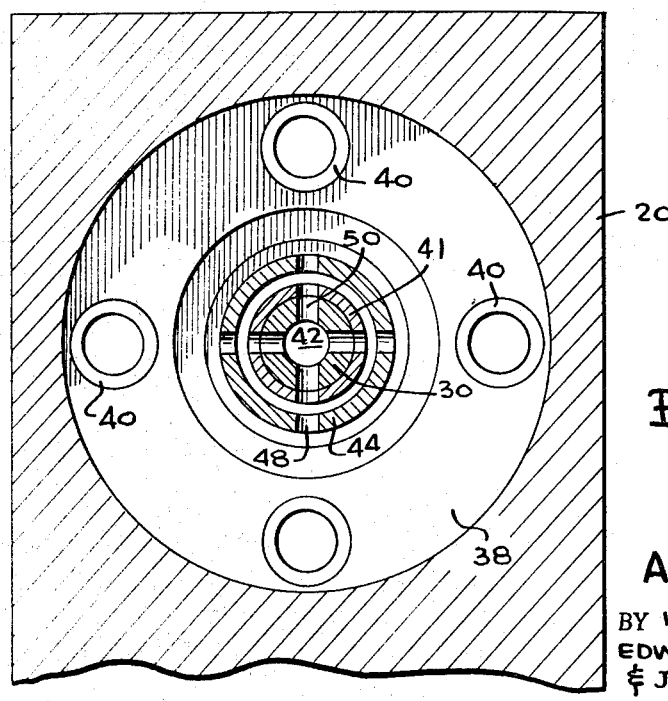
FIG. 4 is a sectional view taken along lines 4—4 of FIG. 2.

Support block 20 has an interior cavity 38 of cylindrical configuration as shown in FIG. 4 which serves as a fluid input manifold for the vortex chamber in a manner to be discussed. Four couplings 40 are threaded through respective openings in one side of block 20 to communicate so that supply lines 24 which are connected to the couplings supply pressurized fluid to cavity 38 in an obvious manner. It should be noted that the other side of cavity 38 is defined by a removable plate 41 which enables access to the cavity. Shaft 30 is provided with an exterior sleeve 41 as shown in FIG. 2 and has an axially extending bore 42 extending from a central portion thereof to the right end of the shaft as illustrated in FIG. 2.

The central portion of shaft 30 within the confines of cavity 38 and between the respective ball races is provided with a shaft encircling retaining ring 44 for retaining the ball races in spaced location as shown in FIG. 2. Retaining ring 44 contacts sleeve 31 on each axial end of the ring so as to provide an annular opening or passageway 46 extending about the entire periphery of sleeve 41. Communication between cavity 38 and the annular cavity 46 is provided by a plurality of circular openings 48 extending through ring 44 in an obvious manner. Communication between annular opening 46 and the axial bore 42 in shaft 30 is provided by radial bores 50 extending through shaft 30 and sleeve 41.

Shaft 30 is terminated on its right end as viewed in FIG. 2 in an integral connection to a first clamp plate 52 (FIG. 2) which extends laterally with respect to the axis of shaft 30 and is provided with a cylindrical opening or cavity 54 which communicates with the axial bore 42 in shaft 30. The first clamp plate 52 is connected to a second clamp plate 56 by means of plural bolt and nut assemblies 58. The second clamp plate 56 is provided with a cylindrical cavity or opening 60 facing opening 54 of the first clamp plate. A laterally extending plate 62 is sealingly clamped between clamp plates 52 and 56 as shown in FIG. 2. Base plate 62, in turn, serves to retain a removable nozzle ring 64 in position between the base plate and the second clamp plate 56. Nozzle ring 66 is of slightly less diameter than opening 60 so that the entire outer annular portion of opening 60 extends about the entire periphery of nozzle ring 64. Moreover, nozzle ring 64 is provided with a plurality of nozzles or conduits 68 communicating between the portion of opening 60 located about the periphery of the nozzle ring and the portion of opening 60 located within the confines of the nozzle ring as shown in FIG. 3 of the drawings. The nozzle conduits are all oriented at the same given angle with respect to the radii of cylindrical opening 60. The base plate 62 has a series of axially parallel apertures 70 extending therethrough so as to provide communication between opening 54 and that portion of opening 60 exterior of nozzle ring 64.

An axial passageway 71 communicates with that portion of opening 60 within the confines of nozzle ring 64 to provide an exhaust of fluid from within the interior of ring 64. The downstream end of the discharge passageway or conduit 71 is flared at 74 in FIG. 2 to control the pressure level. Flow exhausts through a plurality of elongated discharge slots 76.

The static pressure within discharge conduit 71 is detected by a tap plug 80 located in radial bore passage 71. Moreover, a small-diameter tubular conduit 82 conveys the pressure from passageway 71 through a coupling means 84 to a sealed conduit 86 connected by any suitable rotary seal means to a pressure sensitive read out device 88 in a manner made obvious by inspection of FIG. 2. The pressure read out device 88 can be of any pressure responsive means such as an aneroid switch or a mercury column switch which either makes or breaks an electrical circuit when subjected to a given pressure in excess of a given pressure or, alternatively, less than a given pressure. Moreover, the system of this invention can be used very effectively with a conventional fluidic circuit.

In operation, pressurized fluid (which could normally be air) is introduced through lines 24 into couplings 40 so as to flow into cavity 38. The fluid then flows through passageway 48 into the annular opening 46 for subsequent passage through passageway 50 into the axial bore 42 in shaft 30. Flow from cavity 42 proceeds into opening 54 to subsequently pass through the peripheral openings 70 in the base plate 62. The flow then enters the outer portion of cylindrical opening 60 on the exterior of the nozzle rings 64 and passes through the plural nozzle openings 68 into the portion of cylindrical opening 60 within the confines of nozzle ring 64. The inclination of the nozzles with respect to the center of the chamber creates a vortex of swirling fluid which is discharged into the discharge conduit or passageway 71 to exit through the flared portion 74 and the discharge slots 76 in an obvious manner. It should be kept in mind that the entire system pneumatically downstream from chamber 38 is being rotated by shaft 36 etc. during operation of the device.

FIG. 6 of the drawings illustrates the principles of operation inherent in practice of this invention in that a complete cycle of pressure variation in the discharge conduit is illustrated for a cycle in which the speed of rotation of the vortex chamber is increased to pass through the critical speed range and is then decreased to again pass through a critical speed range to return to the original speed. That portion of the cycle in which the speed is increasing is illustrated by a solid line while the decreasing speed portion is illustrated by a dashed line. At an initial speed of $S_1$, the static pressure in passageway 71 is $P_1$; however, as the rotational speed is gradually increased from $S_1$ to $S_2$, the pressure gradually makes a small increase to $P_2$. However, the critical speed of rotation for the chamber at which a sharp pressure discontinuity takes place begins at $S_2$ with the pressure rapidly changing from the $P_2$ to the $P_4$ level. However, after the device has passed through the critical speed, pressure continuity is again evidenced at the higher level as the speed of rotation in increased to higher speeds such as $S_3$. Therefore, for example, if one were desirous of operating and maintaining a monitored device at speeds no higher than $S_2$, the pressure read out device 88 would be selected to provide an output signal upon the detection of a pressure slightly higher than $P_2$. Such a signal would provide a clear indication that the monitored device was operating at a higher speed than that desired by the operator. Such a signal could be used to control the drive of the monitored device or to provide a warning signal indication to the operator.

When the drive speed of the monitored device is decreased from the relatively high speed $S_3$ to the lower speed $S_1$, the pressure pattern in the discharge conduit 71 does not coincide with the pattern established during the increase in speed from $S_1$ to $S_3$. In fact, the pressure decreases from $S_3$ to $S_1$ in a continuous manner with the pressure dropping in a regularly foreseeable manner to $P_5$. $P_5$ occurs at a speed $S_1$ which begins the decreasing speed critical range at which pressure again becomes discontinuous with the pressure rapidly assuming the lower level $P_1$. Therefore, for example, if the operator was desirous of maintaining a monitored device at a speed greater than $S_1$, the pressure sensitive means 88 would be selected to provide an output signal in response to a detection of a pressure level slightly less than $P_5$. It should be noted that the difference between $S_1$ and $S_2$ is small and is in the order of 5 r.p.m.

The critical speed at which the increasing and decreasing pressure discontinuities occur depends upon the relative vorticity of the flow with respect to the vortex chamber since the relative vorticity is a function of the rotational speed of the nozzle ring and the angle of orientation of the passageways or nozzles 68 in the nozzle ring, the critical speeds can be adjusted by selecting and using a nozzle ring of a particular nozzle orientation. For example, if the desired critical speed desired to be detected should be very low, the nozzle ring employed would be one with a high angle of inclination giving a high vorticity when the device is stationary so that only a slight increase in rotation speed from a stationary condition would be necessary to reach the critical vorticity level resultant in the pressure discontinuity. In some instances, the nozzles could be oriented to provide a vorticity swirl opposite to that provided by the rotational direction of the chamber. Such an opposite direction of swirl could be considered a negative vorticity and would have to be overcome by the rotation of the chamber in order to reach a critical vorticity level at a very high speed.

This method and apparatus is extremely versatile and can be employed for detecting critical rotational speeds over a very wide range. For example, by the selection of proper nozzle rings having the required orientation, the critical speeds can be varied from a very slow speed equivalent to a zero speed condition up to a high rotational speed in the range of 10,000 r.p.m. This versatility of operation is all the more amazing when considered in light of the simplicity of the device for practicing the subject invention and method.

While the inventive method of practicing this invention has been described in terms of a preferred embodiment, it will be obvious to those skilled in the art that the invention is not so limited but is susceptible to various other changes and modifications without departing from the spirit and scope of the invention which should be determined solely by the appended claims.

What we claim is:

1. A method of providing a control signal in response to variations of rotational speed of a monitored rotating body through a selected speed of rotation, said method comprising the steps of drivingly rotating a cylindrical vortex chamber, having circumferentially located fluid emitting nozzles having a radial component of orientation for fluid discharge toward an axial flow discharge line, at a rotational speed proportional to the rotational speed of the monitored rotating body, monitoring the pressure in said axial flow discharge line, and initiating a control signal in response to the detection of a preselected pressure in the flow discharge line which pressure has been preselected to be that which occurs when the speed of rotation of the vortex chamber passes through a critical speed where the pressure in the discharge line abruptly changes from one pressure level to a substantially different pressure level.

2. The method of claim 1 additionally including the step of varying the critical speed by changing the radial component of the nozzles.

3. The method of claim 2 wherein the varying of the radial component of the nozzles is enabled by the substitution of a nozzle providing member having nozzles with a given desired angle of orientation for another nozzle providing member having nozzles oriented at a different angle of orientation.

4. A speed sensing means for detecting rotational speed variations of a controlled member through a critical rotational speed comprising a rotatably supported vortex chamber having an axial gas discharge conduit, a gas inlet connected to nozzle means oriented at an angle with respect to radii of said vortex chamber to provide an absolute gas flow vorticity in accordance with said angle, means for rotating said vortex chamber in accordance with the speed of rotation of said controlled member to produce a relative vorticity between said vortex chamber and the gaseous flow in the vortex chamber and pressure sensing means for sensing pressure in said discharge conduit for detecting a pressure variation from one pressure level to a second significantly different pressure level as occurs during either an increasing or decreasing speed change of said controlled member through said critical rotational speed to provide a control signal in response to said pressure variation.

5. The invention of claim 4 wherein said nozzle means comprises a nozzle ring having a plurality of flow conduits oriented at a desired angle for providing a critical speed of a desired value.

6. The invention of claim 5 additionally including disconnectible means for retaining said nozzle ring in position but enabling easy replacement of said nozzle ring with another nozzle ring having its flow conduits oriented at a different angle so as to provide a different critical speed to be sensed.

7. The invention of claim 6 wherein said vortex chamber is provided by first and second clamp plates with a base plate clamped between said clamp plates and a cylindrical opening in each clamp plate facing the base plate with axially parallel openings about the periphery of the base plate providing fluid communication between said cylindrical openings adjacent the periphery of said cylindrical openings with said nozzle ring being concentrically clamped in said opening in said second clamp plate wherein said first clamp plate is supported for rotation by an axially extending stub shaft supported for rotation by bearing means in a main support and including an axially extending fluid inlet communicating with the cylindrical opening in said first clamp plate for introducing pressurized fluid into said cylindrical opening in said first clamp plate and wherein said discharge conduit is an axial passageway communicating with said cylindrical opening in said second clamp plate.

8. The invention of claim 7 wherein said disconnectible means includes bolt and nut means connecting said first and second clamp plates.

References Cited

UNITED STATES PATENTS

| 3,436,969 | 4/1969 | Phillips | 73—505 |
| 3,447,383 | 6/1969 | Camarata | 73—505 |

JAMES J. GILL, Primary Examiner

U.S. Cl. X.R.

137—81.5